Patented Oct. 12, 1943

2,331,682

UNITED STATES PATENT OFFICE 2,331,682

MANUFACTURE OF CHLOROACETONITRILE

Ingenuin Hechenbleikner, Stamford, Conn., assignor to American Cyanamid Company, New York, N. Y., a corporation of Maine No Drawing. Application February 11, 1942, Serial No. 430,358

4 Claims. (Cl. 260—464)

The present invention relates to methods of preparing chloroacetonitrile.

The principal object of the invention is to prepare the above compound by simple methods which will give good yields of a substantially pure material.

This may be done by reacting glycinonitrile hydrochloride with nitrosyl chloride. As the reaction is somewhat exothermic, it is desirable that external cooling be provided to extract the heat of reaction and prevent undue loss of the volatile reactants.

The above objects may be accomplished by dissolving 45 grams of glycinonitrile hydrochloride (an excess) in 100 cc. of water. This mixture is then cooled in an ice bath and 50 grams of nitrosyl chloride led in during vigorous stirring and while continuing the cooling. The nitrosyl chloride should be added over a period of about one hour whereupon the reaction will be found to be complete. Upon extraction with ether, drying with sodium sulfate and removal of the ether by distillation, 15 grams of chloroacetonitrile are obtainable. This represents a 60% yield.

Instead of the ether extraction step, the chloroacetonitrile may be separated from the reaction mixture by decantation of the aqueous layer. A 40% yield is obtainable under these circumstances and when only one equivalent of nitrosyl chloride is used.

While the invention has been described with specific reference to particular embodiments, it is to be understood that it is not to be limited thereto but is to be construed broadly and restricted solely by the scope of the appended claims.

I claim:

1. A method of producing chloroacetonitrile which includes the steps of reacting glycinonitrile hydrochloride with nitrosyl chloride and recovering the chloroacetonitrile from the reaction product.

2. A method of producing chloroacetonitrile which includes the steps of reacting glycinonitrile hydrochloride with nitrosyl chloride while abstracting the exothermic heat of reaction, and recovering the chloroacetonitrile from the reaction product.

3. A method of producing chloroacetonitrile which includes the steps of reacting glycinonitrile hydrochloride with nitrosyl chloride and recovering the chloroacetonitrile from the reaction product by extracting the same with ether.

4. A method of producing chloroacetonitrile which includes the steps of reacting glycinonitrile hydrochloride with nitrosyl chloride and recovering the chloroacetonitrile from the reaction product, in which more than one equivalent of glycinonitrile hydrochloride is used for each equivalent of nitrosyl chloride.

INGENUIN HECHENBLEIKNER.